(12) United States Patent
Auvolat

(10) Patent No.: US 6,647,065 B1
(45) Date of Patent: Nov. 11, 2003

(54) PROCESS AIMED AT THE EXTRACTION OF ELECTRICAL SIGNALS, WITHOUT BREAKING A LINE PAIR

(75) Inventor: Jean-Paul Auvolat, Montataire (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/435,528

(22) Filed: Nov. 8, 1999

(30) Foreign Application Priority Data

Nov. 18, 1998 (FR) .............................. 98 14487

(51) Int. Cl.[7] .............................. H04B 3/00; H04L 25/00
(52) U.S. Cl. .................. 375/257; 375/220; 375/224; 333/112; 370/241; 324/76.11
(58) Field of Search .................. 375/224, 220, 375/257, 377; 333/1, 24 R, 112, 109, 111; 324/754, 537, 763, 76.11; 370/241, 242

(56) References Cited

U.S. PATENT DOCUMENTS 5,425,052 A   6/1995  Roberts et al.
5,504,736 A   4/1996  Cubbison
6,307,363 B1 * 10/2001 Anderson .................. 324/72.5

\* cited by examiner

*Primary Examiner*—Jean Corrielus
(74) *Attorney, Agent, or Firm*—Roland Plottel

(57) ABSTRACT

Process aimed at the extraction of electrical signals emanating from the two ends of a two wire link between two installations exchanging data, wherein a probe comprising an attenuation cell is plugged in on either side of a break point situated on the line pair, then the connections thus established are isolated in such a way as to transfer the signals to the attenuation cell, the attenuation cell is activated by progressive withdrawal of active components, high-impedance signals are tapped off at the two ends of the attenuation cell, and signals which are images of the electrical signals dispatched by one or other of the ends of the line pair are obtained as output from the attenuation cell, after analogue calculation based on subtraction of the signals and multiplication by a constant which is directly related to the value of the attenuation of the cell.

18 Claims, 5 Drawing Sheets

PROCESS AIMED AT THE EXTRACTION OF ELECTRICAL SIGNALS, WITHOUT BREAKING A LINE PAIR

The present invention relates to a process and to a device for implementing this process making it possible to ensure maintenance on a data transmission network without physical and momentary breaking of the network, these data being furthermore conveyed on a two-wire network.

It is intended more particularly to allow the verification and monitoring of the communication protocols (analysis of signals, analysis of perturbations, on-oscilloscope display, analysis on the _LABVIEW" platform, analysis of frames, protocol analysis (Transpac, Internet etc.), error metering, qualification, CRC extraction, observations/monitoring, levels, jumps in levels, outages and brownouts etc.) exchanged between two installations linked by a two-wire data transmission network operating in Half Duplex" and/or _Full Duplex" mode without resorting to a differential transformer, whilst guaranteeing negligible line attenuation of the order of in particular 0.5 db/600 ohms (impedance to be matched to the bit rate of the line), both in analogue and digital technology.

The known processes have been developed for data transmission networks based on a four-wire architecture, two wires being reserved for sending, two wires being reserved for receiving. With this type of technology, measurement apparatuses comprising a High Impedance input allow the extraction of the signals, without perturbing the exchanges in progress. Depending on how they are hooked up (in parallel on the Send pair or in parallel on the Receive pair), observation will be carried out with regard to the sending of the data or with regard to their reception.

It is easily understood that in a two-wire technology, whether analogue or digital, the two wires convey both a send message and a receive message, it is impossible to introduce a protocol monitoring apparatus without breaking the network. Now, hitherto all the known apparatuses require an interruption, albeit brief, of the network in order to hook up or unhook the device between the installations to be monitored.

The present invention aims to alleviate these drawbacks by proposing a process and a device for implementing this process, which permits the acquisition of signals and their subsequent interpretation, without breaking the line in a two-wire data transmission network.

For this purpose, the process aimed at the extraction of electrical signals emanating from the two ends of a 2 wire link between two installations exchanging data is characterized in that a probe comprising an attenuation cell is plugged in on either side of a break point situated on the line pair, then the connections thus established are isolated in such a way as to transfer the signals to the attenuation cell, the attenuation cell is activated by progressive withdrawal of the active components, high-impedance signals are tapped off at the two ends of the attenuation cell, and signals which are images of the electrical signals dispatched by one or other of the ends of the line pair are obtained as output from the attenuation cell, after analogue calculation based on subtraction of the signals and multiplication by a constant which is directly related to the value of the attenuation of the cell.

Other characteristics and advantages of the present invention will become apparent from the description given hereinbelow, with reference to the appended drawings which illustrate an exemplary embodiment thereof devoid of any limiting character. In the figures.

Figure 1:
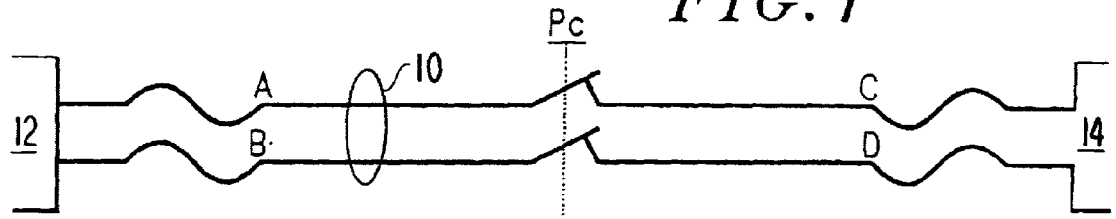
FIG. 1 is a diagram illustrating an example of a line pair linking two installations exchanging information or data of analogue types (telephone links, leased lines etc.) or digital types (Numeris, Transfix, HDSL etc.), this pair being provided with a break point.

According to a preferred embodiment of the process which is the subject of the invention, the process consists in plugging an electronic device into a line pair 10 of a two-wire network linking two installations or two apparatuses 12, 14 exchanging information or data over the two-wire network. The points of connection of these lines to the installations being represented by A, B, C, D, and comprising a break point Pc diagrammatically depicted as substantially between the points A, B on the one hand and C, D on the other hand, but which can depending on the type of installation be shifted inside one installation rather than towards the other. In FIG. 1, it is important to note that the break point Pc is closed, the information being exchanged over the line pair, in one direction or in another, between the two installations.

The device or electronic circuit comprises, on the one hand an attenuation cell 16, and on the other hand a tapping probe 18 comprising the attenuation cell.

Figure 2:
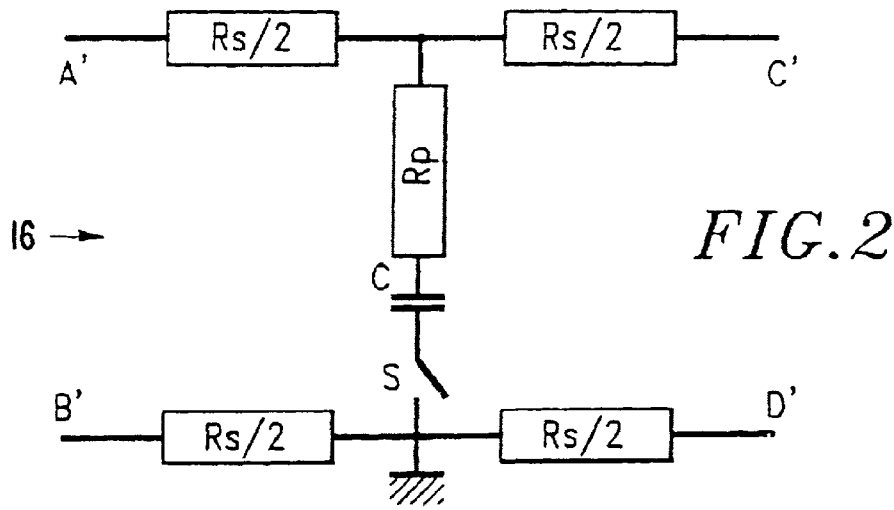
FIG. 2 illustrates the basic electronic circuit of an attenuation cell.

Referring to FIG. 2, the attenuation cell 16 comprises four connection points A', B', C', D' linked together by way of a bridge comprising, on the one hand resistors Rs in the series branches and on the other hand a resistor Rp, at least one capacitor C and a switch S which allows the activation of this cell.

It may be noted that Rs and Rp are related as follows:

$$Rs = Z_0(1-10^{\alpha/20})$$

$$Rp(Z_0-Rs)(Z_0+Rs)/2Rs$$

with α corresponding to the value of the attenuation imposed by the user on the circuit, and in our case α=0.5 db, and with $Z_0$ corresponding to the nominal impedance of the line and of the attenuation cell, and in our case $Z_0$=600 Ω.

Figure 3:
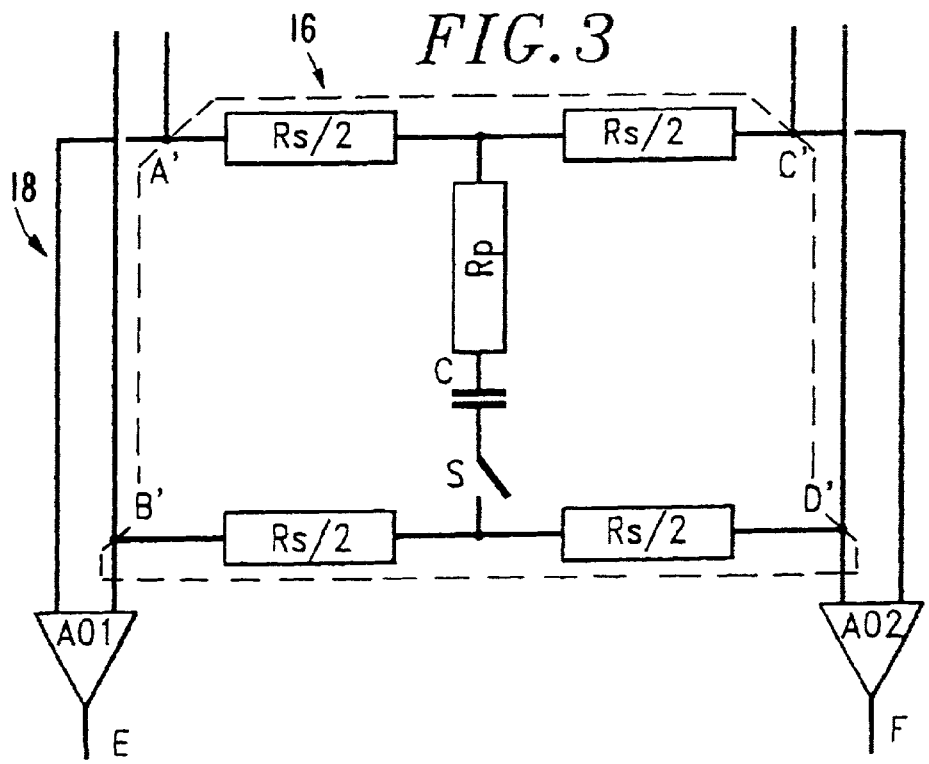
FIG. 3 illustrates the basic electronic circuit of a probe for tapping signals.
Figure 4:
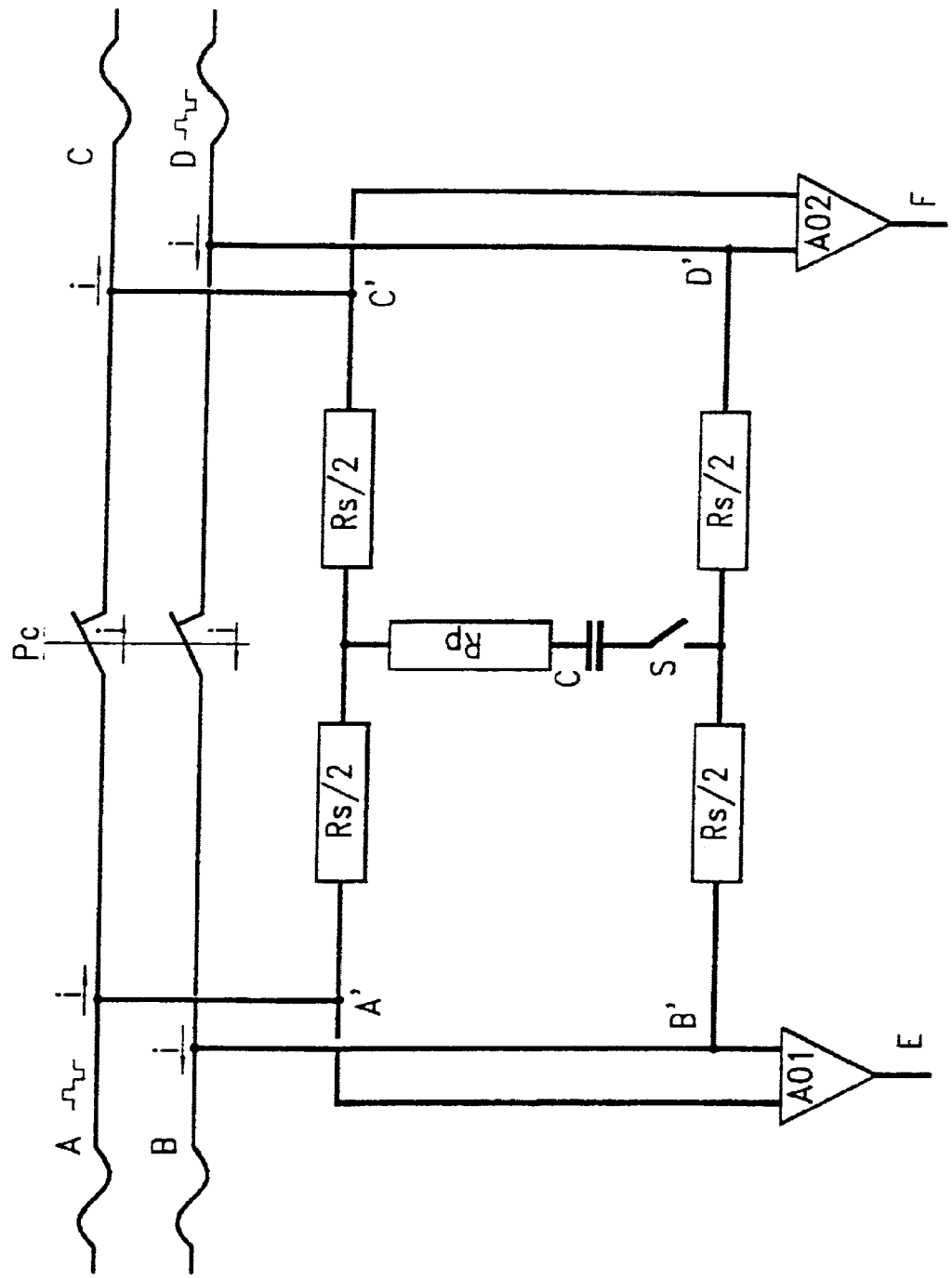
FIG. 4 illustrates the hooking up of a tapping probe to the line pair envisaged in FIG. 1, the probe and the attenuation cell being inactive.

The points A', B', C', D' represent the points of connection of the probe comprising the attenuation cell 16 to the line pair. These points are linked on the one hand to the inverting and noninverting inputs of two operational amplifiers A01 and A02 having outputs E and F as shown in FIG. 3, or of two transformers, (not shown) in such a way as to make a differential digital and/or analogue converter allowing the extraction of high-impedance signals, and on the other hand to the points of connection A, B, C, D of the line pair whose signals it is desired to tap as shown in FIG. 4.

The first phase of the transmission network maintenance process therefore consists in hooking up in parallel, on either side of the break point Pc, on the one hand on the line AC, and on the other hand on the line BD, the four connection points A', B', C', D' originating from the probe and from the attenuation cell.

It may be remarked that the connection points A', B', C', D' correspond respectively to A, B, C, D.

In this phase, the break point Pc is closed, and currents i flow normally between A, C on the one hand, and D, B on the other hand, the line A, C corresponding to a sending of data for example, whereas the line D, B corresponds to a receiving of data for example.

Given the various values of the resistors Rs of the attenuation cell, the signals are not affected by the hooking up of the probe.

Figure 6:
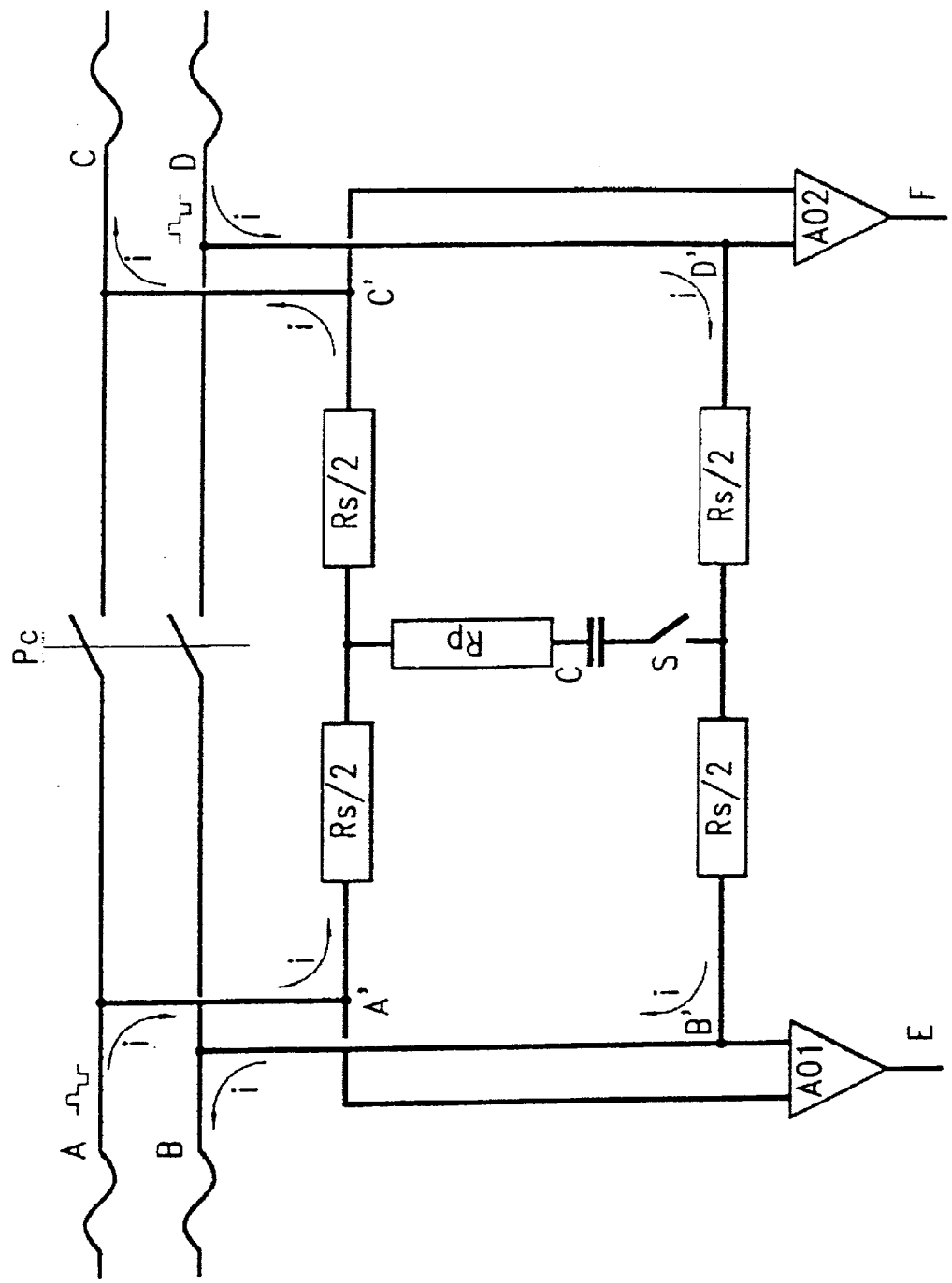
FIG. 6 illustrates the hooking up of a tapping probe to the line pair envisaged in FIG. 1, the break point being open in such a way as to allow the signals to travel into the attenuation cell, without however tapping them off.

The second step of the process, refer to FIG. 6, consists in opening the break point Pc, the switch S of the attenuation cell 6 also being kept open in such a way as to divert the currents i, on the one hand from A to A', then from A' to C', and finally from C' to C, and on the other hand from D to D', then from D' to B, and finally from B' to B, inside the four resistors Rs/2.

In the basic diagram illustrated in FIG. 6 of the electronic circuit, the value of Rs/2 is negligible compared with the resistance of the lines A, C and D, B.

Generally, the break point Pc can be located within a terminal block inside the switchboard, at one or other of the ends situated in the installations, this break point being referred to in the conventional terminology of operators as "a plug or adaptor".

Figure 7:
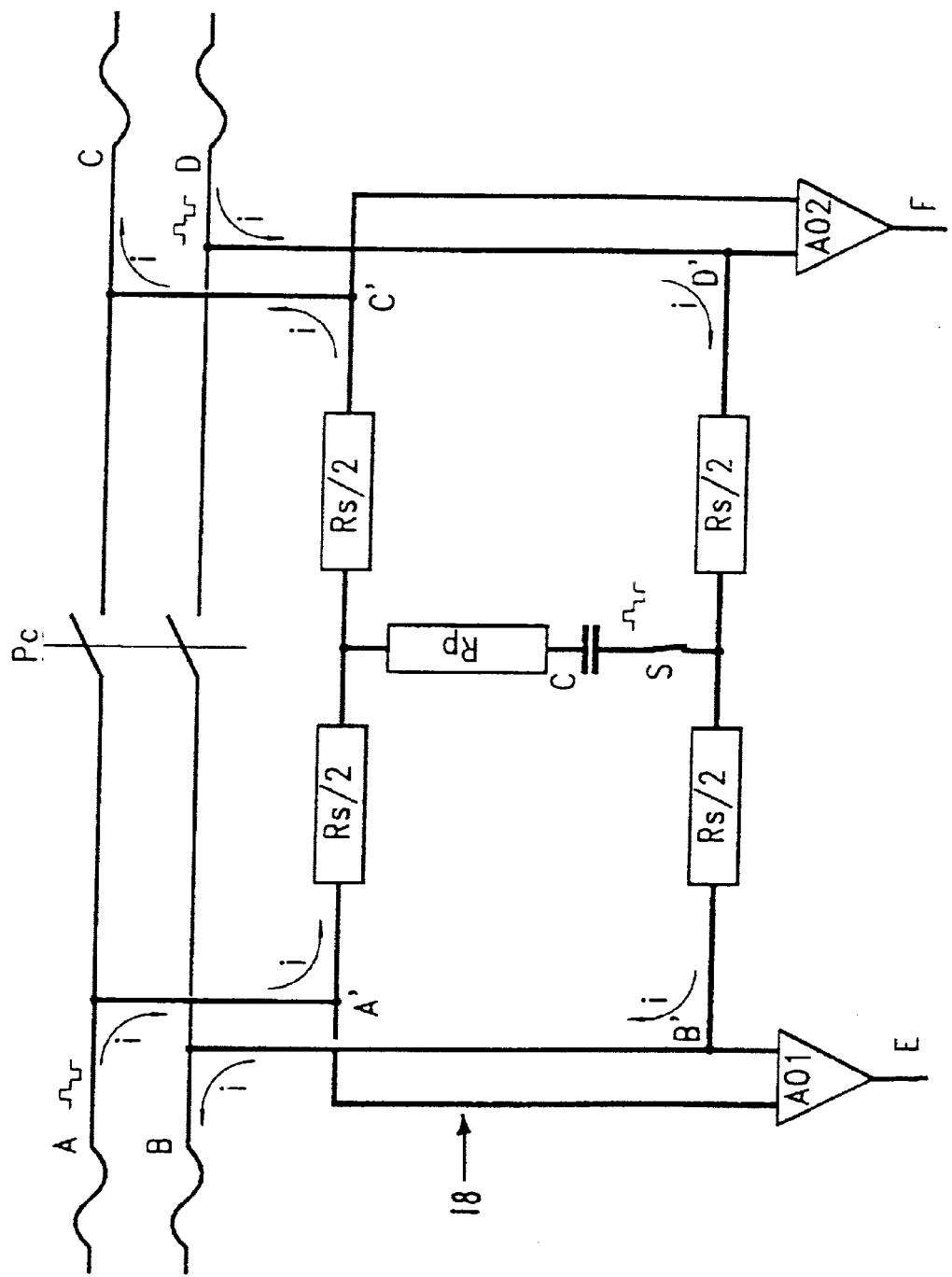
FIG. 7 illustrates the last phase of the hookup and in this configuration the tapping probe is active.

The next step of the process consists in activating the attenuation line modified by progressive withdrawal of active components, thus leaving the nominal value of the attenuation line inserted in series into the link, in our case 3 db. This step is diagrammatically illustrated in FIG. 7, the switch S is closed, the probe 18 becomes active in respect of the variable alternating signals and it is still transparent in respect of the line current, the capacitor C preventing the passage of the DC component of the signal.

In this illustrative case, it is possible to obtain at the level of the outputs E and F, High-Impedance signals which originate from an analogue or digital calculation based on subtraction of the signals and multiplication by a constant which is directly related to the value of the attenuation of the cell, each of the two signals originating from the connection points A at A', B at B' on the one hand, C at C', D at D' on the other hand, by a factor which takes account of the gain of the operational amplifiers A01 and A02, and of the various values given to the resistors Rs and Rp. Images of the signals dispatched by one of the two ends of the line pair linking the two installations are thus extracted at E and at F.

The link is re-established by withdrawing the attenuation cell 16 and the probe 18. The various phases are carried out in reverse: the switch S is opened, the break point Pc is closed, the four connection points A', B', C', D' originating from the probe are disconnected from the four respective points A, B, C, D located on either side of the break point Pc on the line pair 10.

Figure 5:
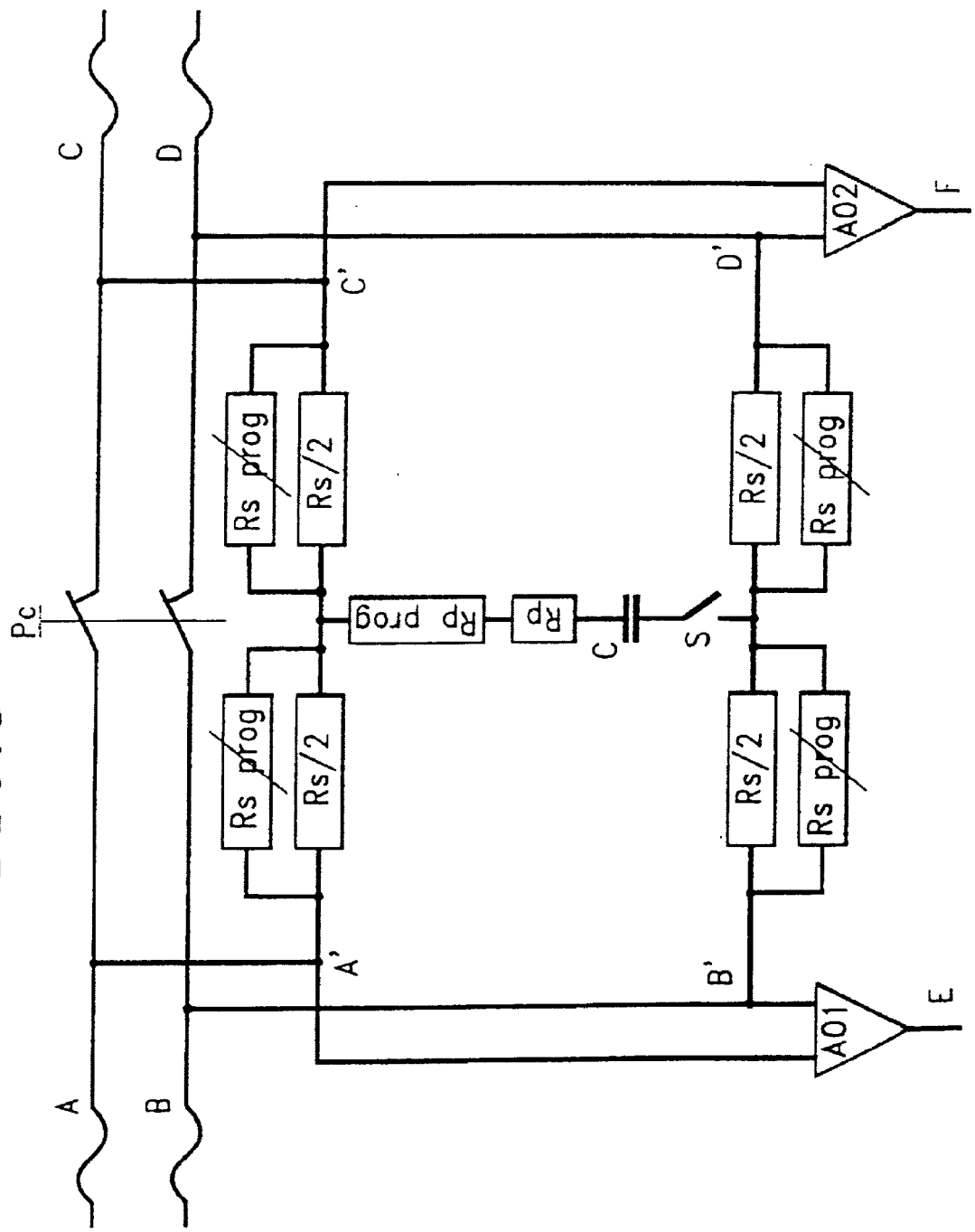
FIG. 5 illustrates the hooking up of a tapping probe according to another embodiment, to the line pair envisaged in FIG. 1, the probe and the attenuation cell being inactive.

As a variant represented in FIG. 5, the various resistors Rs and Rp of the active attenuation cell are optimized by appending programmable resistors, $Rs_{prog}$ and $Rp_{prog}$ respectively, so as to insert the cell progressively into the line pair. In this case, $Rs_{prog}$ is incremented from 10 kΩ to 0Ω whereas $Rp_{prog}$ is decremented from 10 kΩ to 0Ω. This variant whose simplified circuit is represented in FIG. 5 is especially intended in particular for digital technology.

The present invention as described above offers multiple advantages since it guarantees that after insertion of the probe, the electrical signals emanating from the two ends of the two wire link 10 are extracted and made available together with levels and electrical characteristics identical to those which they would have had if the link had been broken and impedance matched at this measurement point.

Of course, the present invention is not limited to the exemplary embodiments described and represented above, but encompasses all variants thereof.

What is claimed is:

1. A process for extraction of electrical signals emanating from ends of a two wire link having a line pair connected between two installations exchanging data, comprising the steps of plugging a probe with an attenuation cell on either side of a break point situated on the line pair, then isolating the connections thus established in such a way as to transfer the signals to the attenuation cell, activating the attenuation cell, tapping off high-impedance signals at two ends of the attenuation cell, and obtaining signals which are images of the electrical signals dispatched by one or other of the ends of the line pair as output from the probe after analogue calculation based on subtraction of the electrical signals and multiplication by a constant which is directly related to an amount of the attenuation of the cell.

2. The process according to claim 1, wherein during the step of plugging the probe into the line pair, connection points emanating from the attenuation cell are connected to connection points situated respectively on either side of the break point, the break point being, during this operation, in a position of closed circuit.

3. The process according to claim 1, wherein the isolating step is performed by an open circuit position.

4. The process according to claim 1, wherein the step of activating the attenuation cell consists in placing active components in series and by closing a circuit situated within the attenuation cell of the probe.

5. A probe for implementing the process according to claim 1, wherein the probe allows extraction of signals sent at each end of the line pair linking said two installations, without line break.

6. The probe according to claim 5, wherein the attenuation cell comprises a plurality of active components mounted as a bridge and a differential digital and analogue converter allowing the extraction of the high-impedance signals.

7. The probe according to claim 5, wherein the attenuation cell comprises a plurality of active components mounted as a bridge and a differential digital or analogue converter allowing the extraction of the high-impedance signals.

8. The probe according to claim 5, wherein the attenuation cell comprises resistors, incremented and decremented respectively according to a given stepsize, in such a way as to allow a progressive insertion of the attenuation cell on the line pair.

9. The probe according to claim 6, wherein the attenuation cell comprises resistors, incremented and decremented respectively according to a given stepsize, in such a way as to allow the progressive insertion of the attenuation cell on the line pair.

10. The process of claim 1, wherein the cell comprises a plurality of active components and the step of activating the attenuation cell comprises progressive withdrawal of said active components.

11. The process according to claim 10, wherein during the step of plugging the probe into the line pair, connection points emanating from the attenuation cell are connected to connection points situated respectively on either side of the break point, the break point being, during this operation, in a position of closed circuit.

12. The process according to claim 10, wherein the isolating step is performed by an open circuit position.

13. The process according to claim 10, wherein the step of activating the attenuation cell consists in placing the active components in series and by closing a circuit situated within the attenuation cell of the probe.

14. A probe for implementing the process according to claim 10, wherein the probe allows extraction of signals sent at each end of the line pair linking said two installations, without line break.

15. The probe according to claim 14, wherein active components are mounted as a bridge, and the probe comprises a differential digital and analogue converter allowing the extraction of high-impedance signals.

16. The probe according to claim 14, wherein the active components are mounted as a bridge, and the probe comprises a differential digital or analogue converter allowing the extraction of high-impedance signals.

17. The probe according to claim 14, wherein the attenuation cell comprises resistors, incremented and decremented respectively according to a given stepsize, in such a way as to allow a progressive insertion of the attenuation cell on the line pair.

18. The probe according to claim 15, wherein the attenuation cell comprises resistors, incremented and decremented respectively according to a given stepsize, in such a way as to allow the progressive insertion of the attenuation cell on the line pair.

* * * * *